K. J. G. DAHL.
SAW CLAMPING DEVICE.
APPLICATION FILED JAN. 23, 1911.

1,003,991.

Patented Sept. 26, 1911.

Witnesses.
A. H. Opsahl.
E. C. Skinkle.

Inventor.
Karl J. G. Dahl
By his Attorneys
Williamson Merchant

COLUMBIA PLANOGRAPH CO., WASHINGTON, D. C.

UNITED STATES PATENT OFFICE.

KARL J. G. DAHL, OF MINNEAPOLIS, MINNESOTA.

SAW-CLAMPING DEVICE.

1,003,991. Specification of Letters Patent. Patented Sept. 26, 1911.

Application filed January 23, 1911. Serial No. 604,101.

*To all whom it may concern:*

Be it known that I, KARL J. G. DAHL, a citizen of the United States, residing at Minneapolis, in the county of Hennepin and State of Minnesota, have invented certain new and useful Improvements in Saw-Clamping Devices; and I do hereby declare the following to be a full, clear, and exact description of the invention, such as will enable others skilled in the art to which it appertains to make and use the same.

My invention has for its object to provide an extremely simple and highly efficient saw clamping device adapted to hold a saw blade while it is being filed.

To such ends the invention consists of the novel devices and combinations of devices hereinafter described and defined in the claims.

In the accompanying drawings, which illustrate the invention, like characters indicate like parts throughout the several views.

Figure 1:
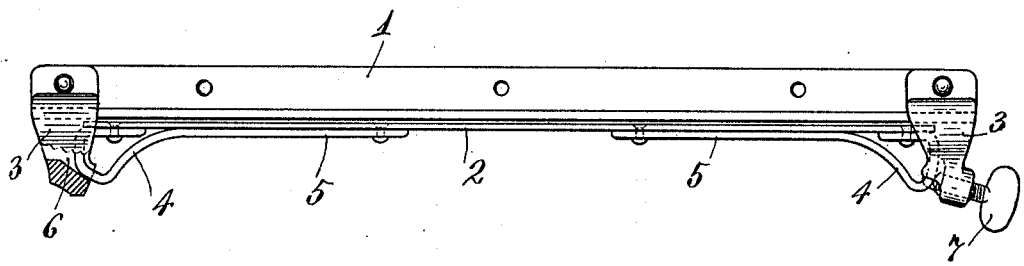
Figure 2:
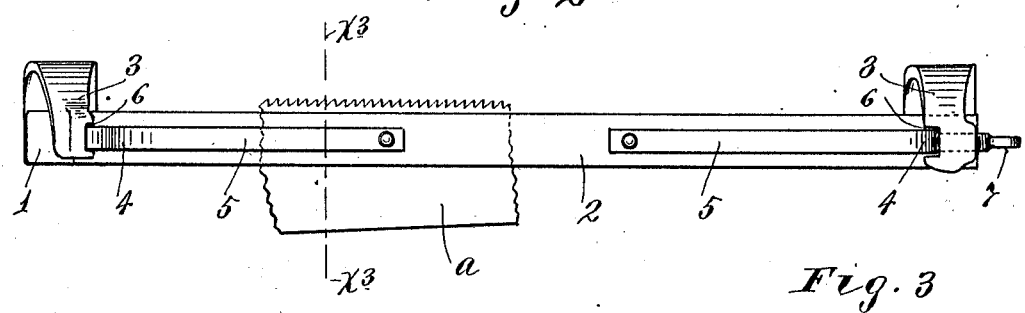
Figure 4:
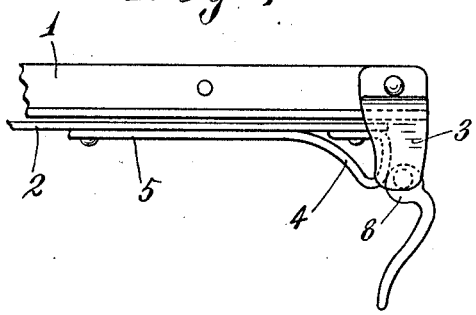
Figure 3:
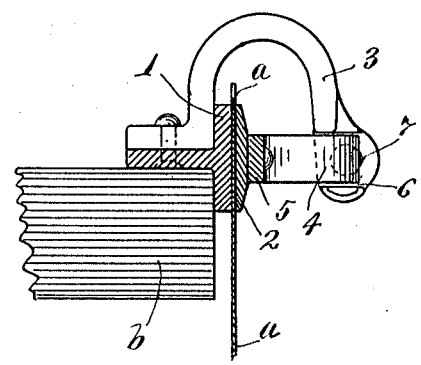

Referring to the drawings: Figure 1 is a plan view with some parts broken away showing the improved device; Fig. 2 is a side elevation of the device showing also a portion of a saw blade held thereby; Fig. 3 is an enlarged vertical section taken on the line $x^3$—$x^3$ of Fig. 2, and showing the device secured to a bench; and Fig. 4 is a view in plan with parts broken away, illustrating a slightly modified form of the device.

The saw clamping device comprises two main elements or members, 1 and 2. The member 1 is a relatively fixed or main body member shown as T-shaped in cross section, and provided with a flat and straight front clamping face, against which the saw blade $a$ is adapted to be clamped by the relatively movable bar 2. The body member 1 is adapted to be secured to a bench or other suitable support by means of screws, clamps or any other suitable devices. At its ends the body member or main clamping bar 1 is provided with abutments preferably in the form of inverted U-shaped arms 3, rigidly secured at one end by rivets to the horizontal flange of the said bar 1.

The clamping bar 2 is preferably constructed from spring steel and at its ends it is provided with heads shown as formed by the looped portions 4 of metal strips 5, which at their ends are riveted to the said bar 2. These strips 5 stiffen the end portions of the bar 2, but leave the central portion thereof resilient. The heads 4 engage with and are held in position by notched seats 6, formed in the ends of the abutments 3. One of the seats 6, to-wit, the left hand seat as shown in Fig. 1, is inclined in respect to the face of the bar 1, so that it has a camming action on the coöperating head 4, tending to force the bar 2 against the bar 1. The abutments 3 at the other end of the bar 1 is provided with a presser device for action on the coöperating head 4, with a force tending to press the bar 2 against the bar 1. In Figs. 1, 2 and 3 this clamping device is shown as in the form of a thumb screw 7, having threaded engagement with the coöperating abutment, while in Fig. 4, the said clamping device is in the form of an eccentric 8 pivoted to the said frame, but operating on the said coöperating head 4. The clamping screw is preferred because it has a wider range of adjustment.

When the saw blade $a$ is placed between the clamping bars 1 and 2, as shown in Fig. 2, and the screw 7 or the eccentric is forced against the adjacent head 4, the saw blade will be tightly clamped between the opposing faces of the two bars, 1 and 2. Not only are the end portions of the bar 2 tightly forced against the saw blade, but the intermediate portion of the said bar 2 is also pressed tightly against the saw blade so that the saw blade will be clamped between the two bars at an approximately uniform pressure throughout its engaged portion. The pressure of the intermediate portion of the bar 2 against the saw blade is due to the fact that the endwise pressure applied to the heads 4 is laterally outward of the line of the blade 2, which produces the inward buckling pressure on the flexible central portion of the bar 2. The curved or U-shaped abutments 3 extend high above the upper edges of the clamping bars, 1 and 2, so that the saw clamping or holding device may be applied to a saw blade that is very much longer than the bars 1 and 2.

The device described is of comparatively small cost, is simple to operate, and in actual practice has been found highly efficient for the purposes had in view.

What I claim is:

1. A saw clamping device comprising a relatively fixed and a relatively movable clamping bar, the former of which is provided at its ends with abutments, and the latter of which is provided at its ends with heads coöperating with seats in said abutments, one of said abutments having a presser device for action on the adjacent head of said movable clamping bar for imparting endwise and lateral movements thereto toward said fixed clamping bar, and the other of said abutments and adjacent head having cam acting surfaces tending to move said movable clamping bar toward said fixed clamping bar under the action of the presser device, substantially as described.

2. A saw clamping device comprising a relatively fixed and a relatively movable clamping bar, the former of which is provided at its ends with abutments, and the latter of which is resilient at its central portion and provided at its ends with heads coöperating with seats in said abutments, one of said abutments having a presser device for action on the adjacent head of said movable clamping bar for imparting endwise and lateral movements thereto toward said fixed clamping bar, and the other of said abutments and adjacent head having cam acting surfaces tending to move said movable clamping bar toward said fixed clamping bar under the action of the presser device, substantially as described.

3. In a saw clamping device, the combination with a main clamping bar having U-shaped abutments at its ends, of a movable clamping bar that is resilient at its central portion, and is provided with laterally off-set heads at its ends, coöperating with seats in the said abutments, one of said abutments having a presser device for action on the adjacent head of said movable clamping bar for imparting endwise and lateral movements thereto toward said fixed clamping bar, and the other of said abutments and adjacent head having cam acting surfaces tending to move said movable clamping bar toward said fixed clamping bar under the action of the presser device, substantially as described.

4. In a saw clamping device, the combination with a main clamping bar provided at its ends with U-shaped abutments, of a movable clamping bar having a resilient central portion, and provided at its ends with metal strips secured thereto and bent to form laterally off-set heads, the said abutments having seats for coöperation with the said heads, one of said abutments having a presser device for action on the adjacent head of said movable clamping bar for imparting endwise and lateral movements thereto toward said fixed clamping bar, and the other of said abutments and adjacent head having cam acting surfaces tending to move said movable clamping bar toward said fixed clamping bar under the action of the presser device, substantially as described.

In testimony whereof I affix my signature in presence of two witnesses.

KARL J. G. DAHL.

Witnesses:
HARRY D. KILGORE,
ALICE V. SWANSON.

---

Copies of this patent may be obtained for five cents each, by addressing the "Commissioner of Patents, Washington, D. C."